United States Patent [19]

Lodrick

[11] 4,213,936

[45] Jul. 22, 1980

[54] FOAM GENERATING AND SPRAYING APPARATUS

[76] Inventor: Robert Lodrick, 6721 Sunset Ave., Independence, Ohio 44131

[21] Appl. No.: 932,120

[22] Filed: Aug. 9, 1978

[51] Int. Cl.$^2$ .................. B01F 17/52; B05B 7/04; B05B 7/06; B05B 7/12

[52] U.S. Cl. .................. 422/133; 239/416.1; 239/427.5; 239/428; 239/432; 239/434.5; 252/359 E; 261/DIG. 26; 366/178; 366/337

[58] Field of Search .............. 422/133; 366/178, 337; 252/359 E; 261/DIG. 26; 239/432, 416.1, 428, 427.5, 434.5

[56] References Cited

U.S. PATENT DOCUMENTS

| | | | |
|---|---|---|---|
| 2,929,436 | 3/1960 | Hampshire | 425/80.1 |
| 3,123,306 | 3/1964 | Bradley | 239/428 |
| 3,199,790 | 8/1965 | Giesemann | 239/428 |
| 3,843,098 | 10/1974 | Phillips et al. | 366/178 |
| 3,946,947 | 3/1976 | Schneider | 239/401 |
| 4,013,228 | 3/1977 | Schneider | 239/434.5 |
| 4,038,037 | 7/1977 | Wilmsen | 422/133 |
| 4,103,876 | 8/1978 | Hasselman et al. | 261/DIG. 26 |
| 4,135,882 | 1/1979 | Harkness et al. | 261/DIG. 26 |

*Primary Examiner*—Bradley R. Garris
*Attorney, Agent, or Firm*—Squire, Sanders & Dempsey

[57] ABSTRACT

A foam generating and spraying apparatus adapted to receive a quantity of polymeric resin and a foaming agent therefor, and emit the foamed product thereof, comprises a resin conduit having an inlet and an outlet end; a foaming chamber having an inlet and an outlet end being disposed coaxially with respect to the resin conduit; a resin inlet upstream of the resin conduit for admitting a quantity of pressurized polymeric resin thereto; a foaming agent inlet upstream of the foaming chamber for admitting a quantity of pressurized foaming agent thereto; a mixing chamber downstream of both of the resin conduit and foaming chamber; and, a spray member disposed at the outlet end of the resin conduit for establishing a hollow cone spray of resin, and angularly directing that spray against the walls of the mixing chamber. Methods for generating a foamed polymeric resin and the products produced thereby are also disclosed herein.

20 Claims, 5 Drawing Figures

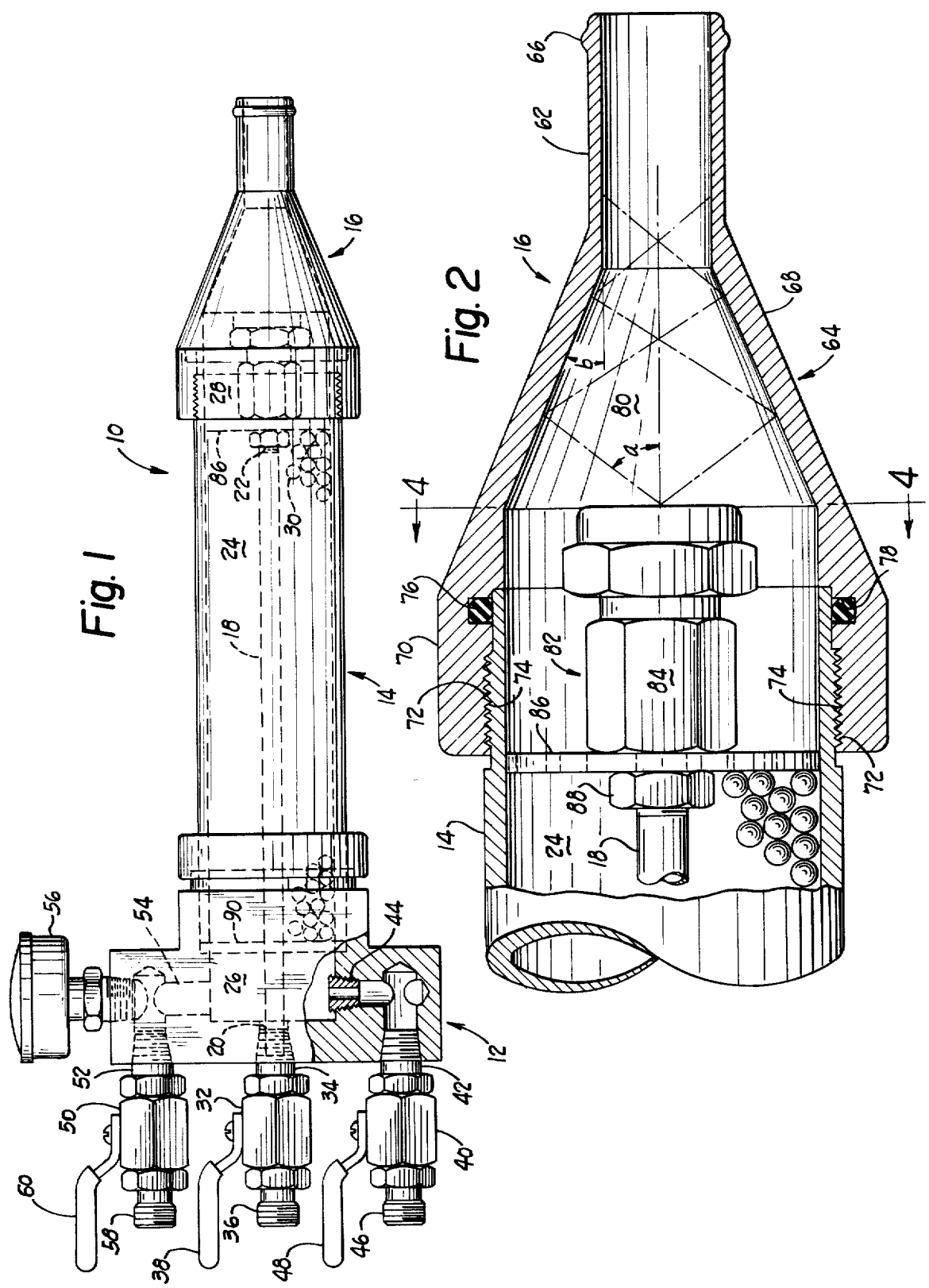

FOAM GENERATING AND SPRAYING APPARATUS

The present invention relates, generally, to method and apparatus for generating a foamed polymeric resin. More particularly, the present invention relates to methods and apparatus for producing a foamed urea formaldehyde resin adapted for use as a thermal and/or acoustical insulation or the like.

The prior art recognizes various methods and means for generating foamed polymeric resins. For example, it has become commonplace to incorporate a gas-generating agent with the polymeric resin prior to the polymerization or cross-linking thereof, whereby subsequent reaction expands the resin in situ. For many commercial applications, however, the in situ foaming of polymeric materials is not feasible or desirable. Accordingly, methods and apparatus for spraying foamed polymeric materials have evolved; particularly for the application of foamed insulating-effective polymers for thermal and/or acoustic insulation of building structures.

One approach is disclosed in U.S. Pat. No. 3,199,790 which relates to a spraying apparatus for the production of foamed plastic materials obtained by mixing a prepared liquid foam solution with a hardenable synthetic resin solution, preferably likewise in the form of an atomized or foam solution. The device employed in this patent includes a pair of chambers or conduits for respectively directing a hardenable resin and liquid foam solution to a mixing chamber. In certain embodiments disclosed, both components are introduced to the mixing chamber in the form of a foamed or a highly agitated solution. In other embodiments, the prepared liquid foam solution is contacted by an atomized or finally divided solution of hardenable resin, the latter being effected by impingement of a stream thereof upon a member disposed in its path. In yet another variation of this device, a jet of compressed air is caused to intersect a liquid stream of resin in order to render the same to a mist or fog-like condition.

The aforementioned approach offers many advantages over those methods directed to foam generation in situ. Nonetheless, the device employed presents certain disadvantages in use. For example, this, and similar devices employing internal diverters or other members interrupting the flow of resin and/or foaming agent, are prone to plugging during use and, accordingly, are subject to the need for repeated periodic cleaning of the internal components. Also, throughput rate of foamed polymer is somewhat reduced by virtue of the interrupting impingement members. Also, because of the internal configuration employed to ensure uniform mixing of the reacting components, it is necessary to include chamber-forming members downstream of this assembly.

A somewhat similar approach is disclosed in British Pat. No. 1,313,103, insofar as the reference discloses a method and apparatus incorporating dual streams of foamed reactants. That is, a first mixture including an aqueous solution of a thermosetting material (e.g. urea formaldehyde resin) and a foaming agent are combined to produce a first foam, while a second mixture including an aqueous solution of a hardener for the resin and a foaming agent are mixed to produce a second foam; the two foam mixtures being subsequently mixed in a mixing chamber to yield the foamed product. Ostensibly, the foregoing process is necessary to ensure a homogeneous mixture of resin and hardener therefor.

Other methods and apparatus for producing foamed polymeric resins are disclosed in U.S. Pat. Nos. 2,630,183; 2,929,436; 2,988,343, and 3,010,658. All of the foregoing methods and apparatus suffer various drawbacks including, for example, an inability to homogeneously mix the resin and hardener therefor, or the need to resort to fairly elaborage methods or structures to achieve that necessary objective. Additionally, plugging or other obstruction of the discharge nozzles of the respective devices are frequently encountered, thereby necessitating periodic disassembly and cleaning of the devices.

Accordingly, the need exists to provide an improved, more efficient and effective method and apparatus for generating and spraying a foamed polymeric resin.

In accordance with the deficiencies of the prior art, it is a principal object of the present invention to provide a simplified, yet efficient, device for generating and spraying a foamed polymeric resin.

It is also an object of the present invention to provide a foam generating and a spraying device particularly adapted for use in the production of foamed insulating products.

Still another object of the present invention is to provide an improved foam generating and spraying device having an increased throughput or volume flow rate.

Another object of the present invention is to provide a foam spraying and generating device which is less susceptible to internal plugging.

Another primary object of the present invention is to provide an improved method for generating and spraying foamed polymeric resins, particularly urea formaldehyde resins, for use in the manufacture of insulating material.

Still a further object of the present invention is to provide an improved insulating product of foamed urea formaldehyde resin adapted for use as thermal and/or acoustical insulation.

It has now been determined, in accordance with the present invention, that the foregoing objects may be realized by providing a foam generating and spraying apparatus comprised of: a resin conduit having an inlet and an outlet end; a foaming chamber having an inlet and an outlet end, wherein the foaming chamber is disposed coaxially with respect to the resin conduit; resin inlet means upstream of the resin conduit for admitting a quantity of pressurized polymeric resin thereto; foaming agent inlet means upstream of the foaming chamber for admitting a quantity of pressurized foaming agent thereto; a mixing chamber downstream of the resin conduit and foaming chamber, which mixing chamber is comprised of side walls which are angularly disposed with respect to the longitudinal axis of the apparatus; and, spraying means disposed at the outlet end of the resin conduit for establishing a hollow cone spray of resin, and angularly directing the spray of resin against the mixing chamber. In a preferred embodiment, the mixing chamber is a generally conically-shaped mixing chamber having inwardly tapering or convergent side walls being in the range of from about 15° to about 30°, while the spray angle of the hollow cone of resin spray will be in the range of from about 45° to about 56°. Preferably, the slope of the tapered walls comprising the preferred mixing chamber varies within the range of from about 19° to about 24°; and more preferably from about 21° to about 23°. Similarly, the spray angle of the hollow cone of resin material is preferably within the range of from about 48° to about 53°; and more preferably, from about 50° to about 51°. Because of the efficiency of the structure of the present invention, only the foaming agent containing the hardener for the resinous material is foamed and no obstructing or ancillary structure need be interposed in the path of the resin stream. A highly preferred resinous material for use in conjunction with the present invention is urea formaldehyde, optionally modified by incorporation of minor proportions of other resinous materials which may be either active substances or non-reactive fillers.

Further objects and advantages of the present invention will become apparent to the skilled artisan, upon examination of the detailed description of preferred embodiments, taken in conjunction with the figures of drawings, wherein:

FIG. 1 is a side elevational view of a preferred foam generating and spraying apparatus of the present invention, with parts broken away for clarity;

FIG. 2 is an exploded, fragmentary side elevational view showing the preferred mixing chamber of the device of the present invention;

Figure 3:
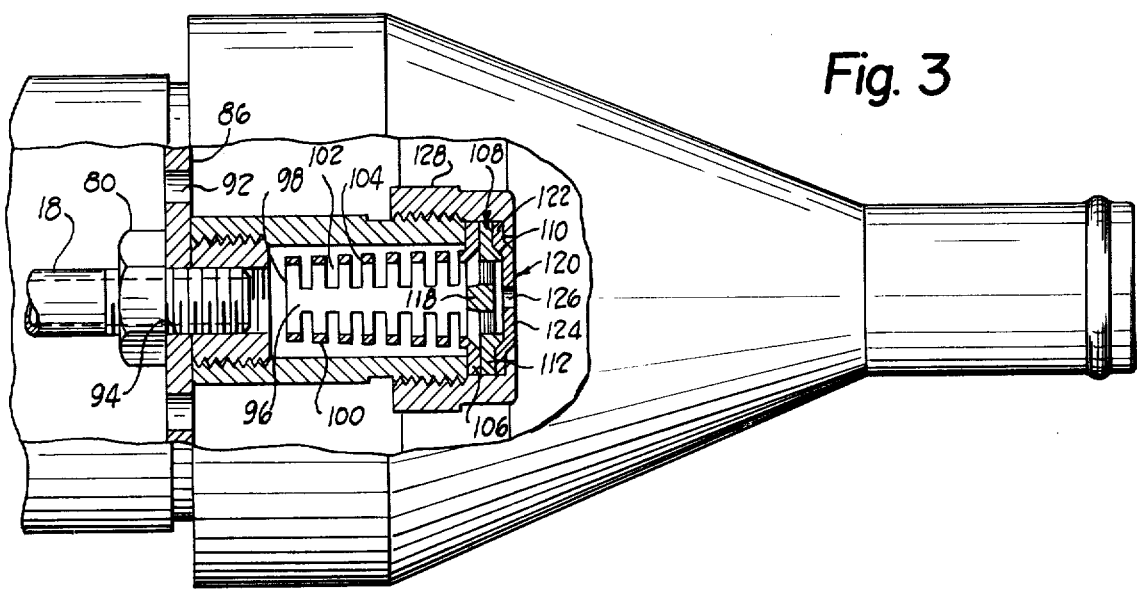
FIG. 3 is a view, similar to FIG. 2, showing the spray head employed in the device of the present invention.

The present invention relates to the generating and spraying of foamed polymeric resins. Along these lines, the invention will be described with reference to the generating and spraying of urea formaldehyde resin for particular use as a thermal and/or acoustical insulation material. However, the skilled artisan will appreciate that such a description is meant to be illustrative only, and not limitative.

Referring now to the figures of drawing, in all of which like parts are identified with like reference characters, FIG. 1 shows a foam generating and spraying device (i.e., a "spray gun"), identified generally as 10. Spray gun 10 is comprised of a manifold section 12, a cylindrical body 14, and a nozzle section 16. The cylindrical body 14 houses a resin conduit 18 having an inlet end 20 and an outlet end 22. Coaxially disposed about the resin conduit 18 is a foaming chamber 24, defined exteriorly by the cylindrical body 14 and having an inlet end 26 and an outlet end 28. The foaming chamber 24 is filled with loosely packed glass beads 30 to assist in the foaming of the mixture introduced thereto (as described more fully hereinbelow); however, chamber 24 might be provided with any of a number of other foaming-effective media or structures such as metal wool, screening, baffles, etc.

Manifold 12 includes a fitting 32 upstream of the resin conduit 18 for admitting pressurized polymeric resin thereto. Fitting 32 has a nipple 34 for connection to the end 20 of resin conduit 18, and a threaded end 36 suitable for cooperation with a hose (not shown) leading to a source of resinous material. A lever 38 is provided to adjust the flow rate of resin through fitting 32.

The manifold 12 further includes a fitting 40 upstream of the foaming chamber 24, for admitting foaming agent thereto. The fitting 40 has a nipple 42 for connection to a metering means 44 disposed upstream of chamber 24, and a threaded end 46 suitable for cooperation with a hose (not shown) leading to a source of foaming agent. A lever 48 controls the admission of foaming agent to spray gun 10, which is metered to the foaming chamber by metering means 44 as described below.

The manifold 12 also includes a fitting 50, joined thereto by a nipple 52, for admitting pressurized gas (e.g., air) to the foaming chamber 24. Compressed gas is routed to chamber 24 via a conduit 54, which also communicates with a meter 56 for monitoring the pressure of the gas. Fitting 50 has a connector end 58 for attachment of a hose (not shown) leading to a source of pressurized gas. A lever 60 controls the flow of gas to the gun.

Nozzle section 16 is comprised of a discharge tube 62 which extends from a mixing head, designated generally as 64. Tube 62 may include a peripheral ring or bulge 66 to retain a discharge hose, if desired. The mixing head 64 shown in the figures of drawing is comprised of inwardly tapering walls 68, which merge with tube 62 at one end and with a circular collar 70 at the other end. Collar 70 includes an internal thread 72 which is designed to mate with corresponding threads 74 near the end of cylindrical body 14 for joining the nozzle section 16 thereto. An annular chamber 76 is provided internally of collar 70, within which an O-ring 78 or similar gasket means is inserted to seal the nozzle section 16 on the cylindrical body 14. Accordingly, the nozzle 16 yields a generally conically shaped internal mixing chamber 80 in this most preferred embodiment. As noted below, other geometries may be employed.

A spray head 82 is located at the outlet end of resin conduit 18 to spray pressurized resin into the mixing chamber 80. The spray head 82 includes a central collar 84 preferably having an internally threaded bore for securing the same on the distal or outlet end or resin conduit 18.

Figure 4:
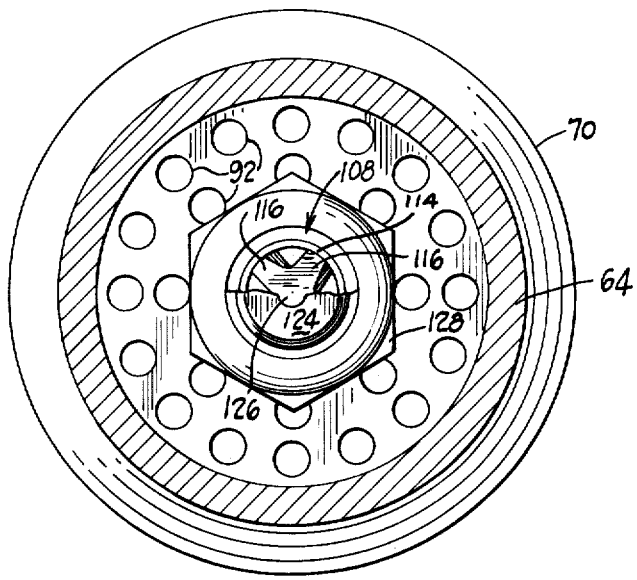
FIG. 4 is a fragmentary cross-sectional view taken substantially along the line 4—4 of FIG. 2; and, FIG. 5 is an end elevational view showing the perforated screen illustrated in FIG. 4.
Figure 5:
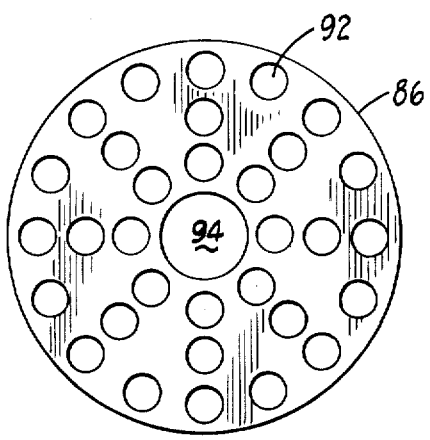

A perforated screen 86 is provided at the outlet end of foaming chamber 24 in order to confine the foaming beads 30 therein, the screen 86 being captured between the collar 84 and a threaded nut 88 which is tightened to positively secure the screen 86 in position. A similar perforated screen 90 is located at the inlet end of the foaming chamber 24 to serve a similar purpose. The discharge screen 86, best viewed in FIGS. 4 and 5, includes a number of apertures 92 through which the foamed foaming agent issues into mixing chamber 80. A central aperture 94 is included for mounting the screen 86 on the resin conduit 18. The screen 90 at the inlet side of the foaming agent chamber 24 has a similar configuration in order to permit compressed gas and foaming agent to pass to the chamber 24.

The spray head 82 is comprised of an internal generally cylindrical strainer 96 for removing any particulate or gelled material from the resin stream flowing through conduit 18. The strainer is formed with a solid end wall 98 and a slightly tapered side wall 100 having a plurality of circumferential slits 102 through which resin may pass to an axial chamber 104. The strainer 96 terminates at a peripherial outwardly directed lip 106 to position the strainer member within the spray head 82.

A core 108 is disposed adjacent the strainer 96. The core 108 is comprised of a generally circular panel 110 having a flange 112 and a central, perforated web 114. The perforated web includes a plurality of, (preferably four) turbine-like vanes 116, as best viewed in FIG. 4. The vanes 116 may have either a right-hand or left-hand twist in order to impart an appropriate swirling or rotating motion to the resin flowing within the spray head 82. A shank 118 projects from the central web 114 into the axial chamber 104 of the strainer 96.

A discharge plate 120 is located downstream of the core 108. Discharge plate 120 comprises a peripheral flange 122 for securing the same within the spray head 82 and a central web 124, having a discharge metering orifice 126 through which resin spray issues. The discharge plate is retained in position on spray head 82 by a threaded collar 128.

The spray head 82 is specifically designed to provide a hollow cone spray of pressurized resin within the mixing chamber 80. Accordingly, as this is the principal purpose of the spray head (all other factors being equal), spray heads appropriate for use in the spray gun of the present invention may be commercially procured, parameters such as capacity, and the like, being easily determined by the skilled artisan depending upon the requirements of a given application and subject to the critical requirements set forth hereinbelow. Spray heads suitable for use in the spray gun of the present invention may be purchased from Spraying Systems Co., Wheaton, Illinois.

Operation of a spray gun 10 is simple and efficient, these attributes owing to a simplicity of design which nonetheless ensures uniform mixing of the constituents comprising the foam mixture. Pressurized resin is admitted to the resin conduit 18 by appropriate manipulation of the lever 38 on fitting 32. The pressurized resin is transmitted to spray head 82 where any particulate or gel material contained therein is removed by the filtering action of screen 96. The pressurized resin then enters the axial channel 104 and is passed through core 108 where the vanes 116 impart a swirling or rotation motion to the stream of pressurized resin. Subsequently, the pressurized resin is sprayed through metering orifice 126 in the form of a hollow cone having a spray angle, identified as (a) in FIG. 2. Both the flow rate of resin through spray head 82, and thus the volume thereof, as well as the spray angle are carefully controlled within certain limits, which limits are particularly sensitive to the combined influences of orifice size and pressure of the resin stream as described more fully below.

Simultaneously, foaming agent and compressed gas are admitted to the inlet end of foaming chamber 24 by appropriate manipulation of levers 48 and 60, respectively. The gas flow may be regulated in any convenient manner, and an indication thereof will be provided by way of pressure gauge 56. Regulation of the flow rate of foaming agent is achieved by way of metering means 44 having a metering orifice specifically dimensioned to provide a flow rate of foaming agent consistent with the volume of resin issuing through metering orifice 126. That is, the relative proportions of resin and foaming agent may be tailored by suitably dimensioning the respective internal diameters of the orifice sizes in members 44 and 126 to provide the desired ratio of constituents in order to produce a self-sustaining foam product.

Compressed gas and foaming agent enter foaming chamber 24 through perforated screen 90. The liquid foaming agent under the combined influence of the compressed gas and foaming beads 30 is highly agitated into a frothy or foamy consistency comprised of substantially spherical bubbles of gas surrounded by a film layer of liquid foaming agent. Typically, the foaming agent composition will include a hardener or catalyst for the resin employed, as well as an emulsifier. The foamed foaming agent produced within foaming chamber 24 issues through perforated screen 86 into the mixing chamber 80 whereat the film covered bubbles are intimately mixed with resin material. As the resin overcoats the foaming agent film on the gas bubbles, the hardener component thereof will immediately begin to react with the resin whereupon cross linking of the polymer will initiate.

It is of critical importance that the mixture of resin and foaming agent be complete but that the mixing action itself does not result in such a violent disruption that gas is driven from the liquid mixture, lest the ultimate cured resin exhibit too high a density for its intended purpose. The attainment of optimum mixing is achieved by the construction of the mixing chamber 80 in conjunction with the spray angle of the resin issuing from the spray head 82.

The tapered walls 68 comprising the mixing head 64 have been determined to have an optimum slope which is critical for proper mixing within chamber 80. The slope of these walls, defined by the angle identified as (b), may vary within the broad range of from about 15° to about 30°. However, it is highly preferred that the slope of walls 68 be within the range of from about 19° to about 24°; and even more preferably within the range of from about 21° to about 23°. In conjunction with this criticality, it has been determined that the spray angle (a) is also subject to specific variation in order to achieve optimum mixing and optimum qualities in the product produced. Thus, the spray angle may vary within the broad range of from about 46° to about 56°. However, it is more preferable that the spray angle (a) range from about 48° to about 53°; and still more preferably from about 50° to about 51°.

These critical angles within the mixing chamber 80 provide homogeneous distribution of resin and foaming agent. As the foamed foaming agent enters the mixing chamber through perforated screen 86, it will be contacted by sprayed resin which, as noted, issues from the spray head 82 in the form of a hollow cone. As shown in phantom lines in FIG. 2, the sprayed resin will impinge upon the tapered walls 68 intermediate the length thereof and be reflected repeatedly as the resin and foaming agent are discharged through tube 62. However, by maintaining the angular relationships aforesaid, the mixing action is not so violent as to express the captured compressed gas from the mixture.

The slope of walls 68 will be determined for each nozzle 16 at the time of manufacture and, accordingly, the slope is not subject to variation for a given nozzle 16. However, some flexibility in the spray angle may be provided since the same is a strong function of both the orifice size of metering orifice 126 and the pressure of resin passing through conduit 18. The table below sets forth the angular relationships for a pressure of approximately 60 lbs. per square inch on the resin.

TABLE

| orifice diameter (in.) | .041 | .047 | .063 | .078* | .094** | .109 | .125 |
|---|---|---|---|---|---|---|---|
| spray angle (degrees) | 46 | 47 | 47 | 50 | 50 | 51 | 53 |

*preferred
**most preferred

It has been determined that the spray angle can be varied approximately two degrees on either side of the angle given for a specific orifice diameter by increasing the pressure to about 40 lbs. per square inch.

A particularly preferred polymeric system for use in conjunction with the present invention are the thermosetting resins of urea formaldehyde, particularly where the foamed resin is to be employed as a thermal or acoustical insulation material. Accordingly, the foaming agent employed in conjunction with the urea formaldehyde resins will typically include phosphoric acid and some emulsifier agents; although the skilled artisan will recognize that any foaming agent containing an appropriate hardening for urea formaldehyde might be employed. Similarly, the urea formaldehyde resin, itself, might be modified by additions of minor proportions of, for example, melamine formaldehyde resins, phenol formaldehyde resins, melamine, soluble polyamides, glycols, resorcinol, polyvinyl alcohol, starches, sugars, or the like. Any additional component could be condensed into the urea formaldehyde resin or simply mixed therewith, and in the latter case may be an active substance or simply a nonreactive filler. When applying the preferred urea formaldehyde resins, the gas utilized in forming the foaming agent might be air or any of the inert gases, e.g. argon. All of the foregoing variants are within the ken of the skilled artisan and may be appropriately selected depending upon the needs of a given application, e.g. foamed insulation.

The composition of the final product may be tailored by appropriate selection of the metering orifices 44 and 126. By dimensioning these orifice sizes, it is possible to obtain resin to foaming agent mixture ratios within the range of from about 0.75:1 to about 1.5:1; 1:1 being commonly considered the most feasible mixture proportions. Again, some variation can be achieved by adjustment of the pressurization of the respective constituents without the need to resort to physically changing the orifice members themselves.

In order to provide a fuller understanding of the present invention, the following example is given as illustrative, and not limitative.

EXAMPLE

Employing a spray gun 10 of the present invention, urea formaldehyde resin such as that marketed by Raymond Sales Corporation, Ann Arbor, Michigan, under the name "RAYGARD", is introduced to resin conduit 18 via fitting 32. The urea formaldehyde resin is pumped to the gun from a container under a pressure of 60 psi. Foaming agent supplied with the resin, containing phosphoric acid and suitable emulsifiers, is similarly pumped to foaming chamber 24 through fitting 40 under a pressure of 50 psi. Compressed air at 80 psi is regulated to a flow rate of 5.5 CFM and is also introduced to the foaming chamber via fitting 50. The metering orifices 44 and 126 employed each have diameters of 0.094 inches in order to provide a substantially one-to-one mixture of resin and foaming agent. The spray angle of pressurized resin issuing from spray head 82 is approximately 50 degrees and the pre-established slope of mixing head walls 68 is 23 degrees. The base dimension of the conical mixing chamber 80 (i.e., the measurement between walls 68 along a line in the plane passing vertically through orifice 126) is approximately 1.75 inches, while the height dimension of the chamber (i.e., the measurement between the orifice 126 and the inlet end of discharge tube 62 along a line lying in the plane passing horizontally through orifice 126) is approximately 1.5 inches. The foamed product is discharged through nozzle 16 at a flow rate of 4.5 CFM. The set urea formaldehyde foam is observed to be of low density and have high thermal insulating properties.

The foregoing description of the spray gun 10 of the present invention illustrates the most preferred embodiment of the same, wherein the mixing chamber 80 has a generally conical shape defined by the tapered walls 68. However, certain variations in this geometry may equally well be used and yet attain the highly efficient mixing between resin and foaming agent described above. For example, the walls 68 defining mixing chamber 80 may have a longitudinal curvature (i.e., along the longitudinal axis of gun 10) as well as the transverse curvature inherent in the conical design illustrated (i.e., the circular cross section of the cone). Thus, mixing chamber 80 will take on the configuration of a truncated oval having a circular cross section in this embodiment. In the event the walls 68 are imparted with such a curvature, the slope of a chord joining the ends of the arcuate walls 68 should be maintained within the ranges specified for the angle (b). Under such circumstances, mixing efficiency remains high as does volume flow rate of foamed product through the gun 10.

Another variation within the scope of the present invention regards the hollow cone spray of resin developed by the spray head 82. One particularly important observation with respect to the use of a hollow cone spray is that the resin constituent is caused to transverse a path of repeated reflections off of the walls defining the mixing chamber, in order to preclude the direct discharge of resin from spray head 82 through discharge tube 62 without sufficient residence time to properly interact with the foamed foaming agent prior to such discharge. Accordingly, a spray of resin in the form of an ovate geometry is a viable alternative to a hollow cone spray; provided the same hollow geometry of the spray is maintained.

A particularly desirable advantage of the method and apparatus of the present invention is that the pressures employed to drive the liquid components may be reduced considerably over these necessarily employed in the prior art in order to achieve a useable product. This advantage resides, in part, in the simplicity and efficiency of the mixing head 64 in providing a homogeneous admixture of the constituents comprising the foam. Thus, while the foregoing example employs pressures of 50-60 psi, the same can be reduced to approximately 20 psi without sacrificing the quality of the formed product. When it is desired to so reduce pressure on the liquid components, metering orifices 44 and 126 can be changed to ensure proper spray angle and maintenance of flow rate.

While the invention has now been described with reference to certain preferred embodiments and exemplified with respect thereto, the skilled artisan will appreciate that various substitutions, modifications, changes and omissions may be made without departing from the spirit thereof. Accordingly, it is intended that the scope of the present invention be limited solely by that of the following claims.

What I claim is:

1. A foam generating and spraying apparatus adapted to receive a quantity of hardenable polymeric resin and a foaming agent therefor, and discharge the foamed product thereof, said apparatus comprising:
   (a) a resin conduit having inlet and outlet ends;
   (b) a foaming chamber having inlet and outlet ends, said foaming chamber being disposed coaxially with respect to said resin conduit;
   (c) resin inlet means upstream of said resin conduit for admitting a quantity of pressurized resin thereto;

(d) foaming agent inlet means upstream of said foaming chamber for admitting a quantity of pressurized foaming agent thereto;

(e) a mixing chamber downstream of said resin conduit and said foaming chamber, said mixing chamber including progressively inwardly sloping walls joining a discharge tube at the apex of said mixing chamber, the slope of said walls being in the range of from about 15° to about 30°; and, (f) spray means at the outlet end of said resin conduit for spraying resin against said sloping walls in the form of a hollow cone spray having a spray angle in the range of from about 45° to about 56°.

2. The apparatus of claim 1, wherein said mixing chamber is a generally truncated ovate mixing chamber having a circular cross section and arcuate longitudinal walls, and wherein a chordal segment joining the ends of said arcuate longitudinal walls has a slope in the range of from about 15° to about 30°.

3. The apparatus of claim 1, wherein said mixing chamber comprises a generally conically-shaped mixing chamber having inwardly tapered walls.

4. The apparatus of claim 3, wherein said slope of said tapered walls is in the range of from about 19° to about 24°.

5. The apparatus of claim 4, wherein said slope of said tapered walls is in the range of from about 21° to about 23°.

6. The apparatus of claim 3, wherein said spray angle of said hollow cone spray of resin is in the range of from about 48° to about 53°.

7. The apparatus of claim 6, wherein said spray angle of said hollow cone spray of resin is in the range of from about 50° to about 51°.

8. The apparatus of claim 3, wherein:
(a) said slope of said tapered walls is in the range of from about 19° to about 24°; and,
(b) said spray angle of said hollow cone spray of resin is in the range of from about 48° to 53°.

9. The apparatus of claim 8, wherein:
(a) said slope of said tapered walls is in the range of from about 21 to about 23; and,
(b) said spray angle of said hollow cone spray of resin is in the range of from about 50° to about 51°.

10. The apparatus of claim 3, further comprising:
(a) resin metering means proximate the outlet end of said resin conduit for emitting a controlled amount of resin to said mixing chamber; and,
(b) foaming agent metering means proximate the inlet end of said foaming chamber for admitting a controlled amount of foaming agent thereto.

11. The apparatus of claim 10, wherein each of said metering means includes a metering means includes a metering orifice, the ratio of the metering orifice size for said resin and the metering orifice size for said foaming agent being in the range of from about 0.75:1 to 1.5:1.

12. The apparatus of claim 11, wherein said ratio of orifice sizes is about 1:1.

13. The apparatus of claim 3, further comprising gas inlet means upstream of said foaming chamber for admitting pressurized gas thereto.

14. The apparatus of claim 13, wherein said foaming chamber comprises a hollow cylinder disposed coaxially radially outwardly of said resin conduit, said cylinder being filled with loosely packed foaming beads restrained therein by a pair of perforated plates, one of each of said plates being disposed proximate the inlet and outlet ends of said foaming chamber.

15. The apparatus of claim 14, further comprising:
(a) resin metering means proximate the outlet end of said resin conduit for emitting a controlled amount of resin to said mixing chamber; and,
(b) foaming agent metering means proximate the inlet end of said foaming chamber for admitting a controlled amount of foaming agent thereto; and wherein each of said metering means includes an orifice, the ratio of orifice sizes establishing a mixture of resin to foaming agent in the range of from about 0.75:1 to 1.5:1.

16. A mixing head for a foam generating and spraying apparatus, having a spray head adapted to spray a quantity of pressurized resin into a mixing chamber containing a foamed foaming agent therefor, said mixing head comprising:
(a) a mixing chamber including progressively inwardly sloping side walls having a slope in the range of from about 15° to about 30°; and,
(b) a spray head for spraying resin against said side walls in the foam of a hollow cone spray having a spray angle in the range of from about 45° to about 56°.

17. The mixing head of claim 16, wherein said mixing chamber is a generally truncated ovate mixing chamber having a circular cross section and arcuate longitudinal walls, and wherein a chordal segment joining the ends of said arcuate longitudinal walls has a slope in the range of from about 15° to about 30°.

18. The mixing head of claim 16, wherein said mixing chamber is a generally conically shaped mixing chamber having inwardly tapered side walls.

19. The mixing head of claim 18, wherein:
(a) said slope of said tapered walls is in the range of from about 19° to about 24°; and,
(b) said spray angle of said hollow cone spray of resin is in the range of rom about 48° to about 53°.

20. The mixing head of claim 19, wherein:
(a) said slope of said tapered walls is in the range of from about 21° to about 23°; and,
(b) said spray angle of said hollow cone spray of resin is in the range of from about 50° to about 51°.

* * * * *